Figures 1, 2:
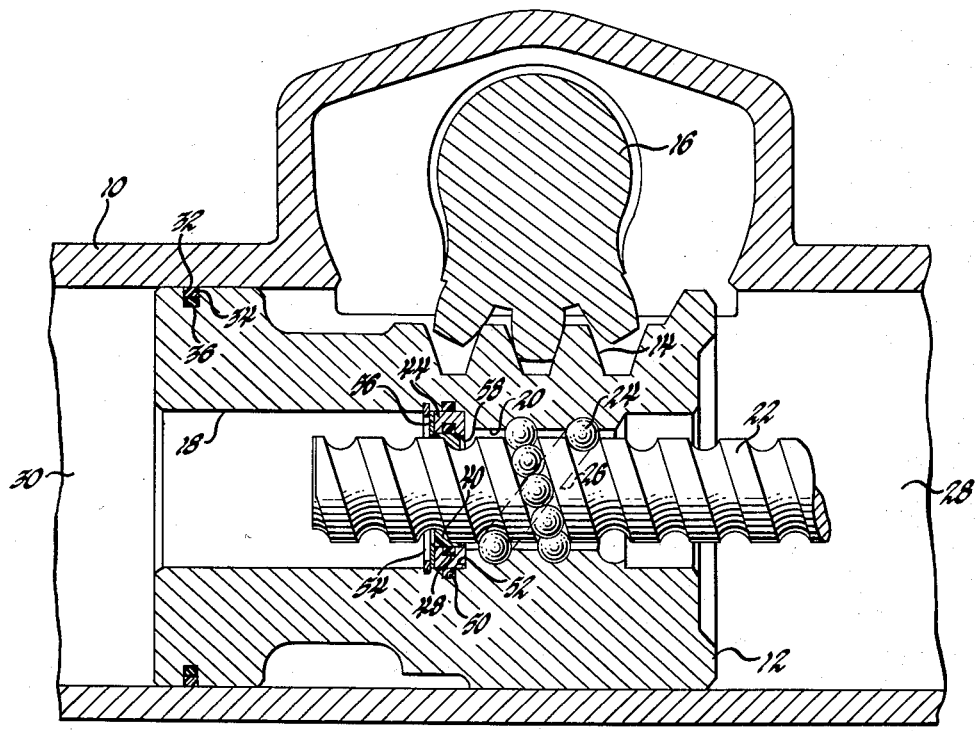

Jan. 7, 1964   G. A. EDWARDS   3,116,931
HIGH PRESSURE HELICAL WORM SEAL
Filed Dec. 23, 1960

INVENTOR.
George A. Edwards
BY
Bryce Beecher
ATTORNEY

United States Patent Office 3,116,931
Patented Jan. 7, 1964

3,116,931
HIGH PRESSURE HELICAL WORM SEAL
George A. Edwards, Saginaw, Mich., assignor to General Motors Corporation, Detroit, Mich., a corporation of Delaware
Filed Dec. 23, 1960, Ser. No. 78,106
3 Claims. (Cl. 277—165)

This invention relates to a seal structure particularly adapted for preventing leakage through a piston having a bore helically grooved in a manner complementary to a worm accommodated in the bore and adapted on rotation to axially displace the piston.

This arrangement is now common in power steering gears of the inline integral type, i.e., power steering gears in which the power cylinder is coaxial with the steering shaft. For an example of such a gear see copending application Serial No. 762,153, filed September 19, 1958, now Patent Number 3,022,772, in the names of William B. Thompson and Philip B. Zeigler as a continuation-in-part of their application Serial No. 687,728, now abandoned.

As shown in the identified application, it has heretofore been the practice to close the piston bore at the end thereof farthest removed from the worm by means of a plug element held in place by a snap ring and locating a static seal. While this plug has proven quite effective in preventing fluid flow through the bore, it makes necessary the employment of a piston of excessive length since the distance between the free end of the worm and plug cannot be less than the maximum axial displacement of the piston in the direction away from the free end of the worm. The excessive length of the piston takes up space within the engine compartment of the vehicle needed for other accessories and represents a waste of metal.

In accordance with the present invention, the said plug and static seal are omitted in favor of a seal structure disposed within the piston bore and through which the worm extends.

The seal structure herein is particularly characterized in that it incorporates a ring element formed of a low friction, long wearing material of limited elasticity which immediately surrounds the worm and is internally helically threaded to allow the worm to turn therein.

The invention will be particularly described in terms of a preferred embodiment thereof illustrated by the accompanying drawings in which:

FIGURE 1 is a fragmentary, longitudinal section of a portion of a power steering gear incorporating the seal structure; and FIGURE 2 is a broken isometric view showing the ring portion of the seal structure referred to hereinbefore.

Referring first to FIGURE 1, the numeral 10 denotes a power cylinder confining a piston 12 having rack teeth 14. These teeth engage with the teeth of a gear sector 16 which may be assumed as integral with a cross shaft carrying a pitman arm, not shown, through which the steering linkage of the vehicle is actuated.

Piston 12 has a central bore 18 reduced in diameter at 20. In this area (20) the piston is provided with a helical groove coacting with the groove of the worm 22 to provide a race for balls 24 which in operation of the gear move in a path made endless by a transfer or return tube indicated at 26.

Piston 12 delineates two working chambers 28 and 30 in which the fluid pressure is determined by the control valve component of the steering gear. The control valve preferably takes the form of the valve described in the previously mentioned application Serial No. 762,153. Suffice it to say that on a right turn a pressure differential is created across the piston in favor of the chamber 28, while on a left turn the pressure differential is in favor of the chamber 30.

A composite seal located in an annular groove 32 and comprising an outer ring or band 34 desirably formed of Teflon and an inner O-ring component 36 prevents leakage between the chambers 28 and 30 about the outer periphery of the piston 12. Such a composite seal will be found described in copending application, Serial No. 807,709, filed April 20, 1959 in the name of Walter H. West, as a cintinuation-in-part of his application Serial No. 512,670. As explained in the West application, fluid entering the annular groove 32 under the Teflon band operates to distort the O-ring which is thus caused to exert a radial pressure on the Teflon band, forcing it into sealing engagement with the wall of the cylinder.

Leakage between the chambers 28 and 30 through the bore 18 is prevented by the seal structure of the present invention. This structure includes a ring element 40 immediately surrounding the worm 22 and comprising a helical land 42, the conformation and lead of which is set by the worm 22. The ring element 40 is desirably formed of Teflon since such material exhibits the requisite low friction and long wearing qualities. Teflon is defined in the literature as polymeric tetrafluoroethylene. A process for preparing it is described in Patent No. 2,394,243 to Robert M. Joyce, Jr.

Surrounding the ring element 40 is a metal retainer 44 spacing a pair of concentric O-rings 48 and 50. O-ring 48 is received in a recess formed in the retainer which will be noted as securing the O-ring 50 in an annular groove in the wall of the bore 18. The retainer abuts a shoulder 52 formed by the reduction in the diameter of the bore 18 in the area of the ball connection and is maintained against axial displacement away from the shoulder by a snap ring 54 acting through a back-up washer 56. A counter recess 58 in the retainer accommodates the edge of the ring element 40 nearest the shoulder 52.

With the arrangement as described and illustrated, it should be apparent that an effective seal is provided which prevents the flow of fluid from either of the working chambers into the other through the piston bore and that by virtue of the nature of the ring 40 the sealing effect is achieved without the introduction of friction forces appreciably affecting the operation of the gear.

I claim:

1. A sealing device comprising a polymeric ring element having an internal helical thread adapted to engage the groove of a worm in sealing relationship, seal retaining means surrounding said ring element and engageable therewith to prevent axial displacement thereof, a flexible sealing annulus circumjacent said ring element being radially sealable therewith and operable for forcing it into sealing engagement with the worm groove, and means preventing axial displacement of said seal retaining means.

2. A sealing device comprising a polymeric ring element having an internal helical thread adapted to engage the thread of a worm in sealing relationship, a first ring of an elastomeric material immediately surrounding said ring element operable for forcing it into sealing engagement with the worm, a second ring of elastomeric material surrounding said first elastomeric ring, retainer means spacing said elastomeric rings, said retainer means having an annular recess for the reception of said first elastomeric ring and a circumjacent counter recess for receiving the outer periphery of said ring element to prevent its axial displacement, and means preventing axial displacement of said retainer means.

3. A sealing device comprising a polymeric ring element having an internal helical thread of convex shape adapted to engage the concave thread of a worm in sealing relationship, a first ring of elastomeric material immediately surrounding said ring element operable for forcing it into sealing engagement with the worm thread, a second ring of elastomeric material surrounding said first elastomeric ring, retainer means spacing said elastomeric rings, said retainer means having an annular recess for the reception of said first elastomeric ring and a circumjacent counter recess for receiving the outer periphery of said ring element to prevent its axial displacement, and means adjacent said retainer means preventing axial displacement thereof.

References Cited in the file of this patent
UNITED STATES PATENTS

| | | |
|---|---|---|
| 2,420,040 | Frisby et al. | May 6, 1947 |
| 2,757,548 | Smith et al. | Aug. 7, 1956 |
| 2,765,185 | Mott | Oct. 2, 1956 |
| 2,897,684 | Lincoln et al. | Aug. 5, 1959 |
| 2,917,329 | Laser | Dec. 15, 1959 |
| 2,936,643 | Smith et al. | May 17, 1960 |
| 2,945,392 | Folkerts | July 19, 1960 |
| 2,953,932 | Lincoln | Sept. 27, 1960 |

FOREIGN PATENTS

| | | |
|---|---|---|
| 693,131 | Germany | June 6, 1940 |